Patented Feb. 18, 1947

2,416,218

UNITED STATES PATENT OFFICE 2,416,218

PLASTIC REACTION PRODUCTS OF REACTIVE METHYLENE COMPOUNDS WITH WAX-SUBSTITUTED AROMATIC COMPOUNDS

Orland M. Reiff, Woodbury, N. J., assignor to Socony-Vacuum Oil Company, Incorporated, a corporation of New York No Drawing. Application August 6, 1942, Serial No. 453,847

4 Claims. (Cl. 260—51)

This invention has reference to novel compositions of matter having rubber-like properties produced by the action of aldehydes, aldehyde amines, halides of sulfur and other agents, known to have the effect of resinifying phenols, on poly-arylated petroleum waxes and the like wherein the substituent aryl groups are in the nature of phenols.

The techniques for resinification of phenols with a wide variety of resinifying agents to produce hard, brittle resins are well known, and a large number of types of such products have been produced and are in wide use. In many cases, the aromatic body is substituted by alkyl groups but in all such instances, the aromatic reactant has been characterized by a molecule having a single aryl nucleus. I have now found that resilient masses having extremely high resistance to shock may be prepared by reactions paralleling the known resinifications noted above, but differing therefrom in that the raw material employed is derived from petroleum wax or the like which has been poly-arylated with phenols. As will be apparent from the detailed discussion hereinafter, the intermediate normally includes aromatic nuclei which are substituted at a plurality of points by alkyl groups. However, since the average alkyl group bears a number of aryl substituents, and in order to clearly point out the different nature of this raw material, it will be referred to herein as "poly-aryl aliphatic."

Many of the present products strongly resemble rubber in its more usual commercial forms having substantial elasticity, tensile strength, etc. All of the products may be said to be "rubber-like" in that they resemble some form of rubber. Certain preferred forms have somewhat the appearance and properties of such rubber forms as ebonite. The key to the properties obtained according to this invention lies in the nature of the aliphatic portion of the molecule of the poly-aryl aliphatic and the degree of its substitution with aryl nuclei of the type specified. The aliphatic is typified by alkyl groups derived from petroleum wax. This is a mixture of straight-chain aliphatic hydrocarbons of relatively high molecular weight, the molecular weight averaging around 300 or higher. The average molecule, statistically, is of about 24 carbon atoms and the mixture is predominantly made up of molecules of at least 20 carbon atoms. Some petroleum waxes are reported to include aliphatic hydrocarbons of as few as 15 carbon atoms, but the proportion of constituents having less than 20 carbon atoms is very minor. In general, aliphatics from any source may be employed provided they are predominantly straight-chain compounds of predominantly at least 20 carbon atoms.

The aliphatic hydrocarbons are condensed with hydroxy aromatic compounds to produce the poly-arylated aliphatics.

The hydroxyaromatic compounds which may be used in the practice of my invention are phenols, that is, they are aromatic compounds which have at least one hydroxyl group attached directly to a carbon ring and may be either mono- or poly-nuclear phenols. To more clearly describe the hydroxyaromatic compounds with which this invention is concerned, I may say that the compounds are of the following general formulae:

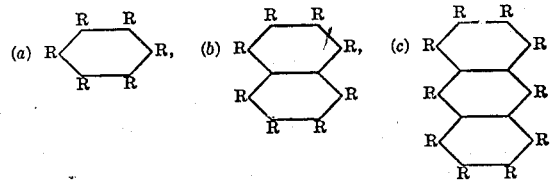

wherein at least one R represents a hydroxy group and the remaining R's may be selected from the group of radicals comprising hydrogen, hydroxy, alkyl, aryl, aralkyl, alkoxy or aroxy. As examples of hydroxyaromatic compounds of the group above defined, I may name phenol, resorcinol, hydroquinone, catechol, xylenol, hydroxy-diphenyl, benzyl phenol, phenyl ethyl phenol, methyl-hydroxy-diphenyl, ethyl-hydroxy-diphenyl, guaiacol, the mono-ethylether of catechol, alpha- and beta-naphthol, alpha- and beta-methyl naphthol, phenyl naphthol, tolyl naphthol, xylyl naphthol, benzyl naphthol, mono-methylether of dihydroxynaphthalene, anthranol, phenyl methyl anthranol, and the like. Because of their tendency to rearrange in the Friedel-Crafts reaction to form hydroxy-arylated waxes, the mixed aryl-aliphatic ethers, such as anisol and alkyl-ethers of naphthols, may also be used. Of the above-named materials, the preferred classes are the mono-hydroxy phenols wherein the remaining R's are hydrogen or alkyl. As to particular compounds, preference is given to the simpler phenols as phenol and beta-naphthol.

The process of arylating the aliphatic may correspond to any of the known methods for a condensation of aliphatics and aromatics usually referred to as alkylation of the aromatic reactant. With the understanding that preparation of the poly-aryl aliphatic may be accomplished in any suitable manner, the invention may well be considered by reference to the classic Friedel-Crafts synthesis as exemplary. Such preparation is preferred because of the control it affords over degree of arylation of the aliphatic and molar ratio of aromatic nuclei to alkyl radicals. Referring more specifically to petroleum wax with the understanding that this typifies the aliphatic hydrocarbons of predominantly straight-chain structure and predominantly at least 20 carbon atoms, a chlorinated wax and a phenol are reacted to produce a poly-arylated wax in which each wax radical is linked to at least 2 aryl radicals. In order to achieve poly-arylation, it is of course necessary that the chlorwax be at least di-chlorinated. Eighteen per cent chlorine seems the lower limit for obtaining final products having sufficient toughness and tensile strength to be of value as rubber-like compositions. It will be recognized that the mixture of chlorwax will contain some trichlorwax and some mono-chlorwax. However, if the proportion of chlorine corresponds substantially to that in the dichlor derivative, the product obtained is substantially the same as that from pure dichlor wax. The wax molecule is arylated during the Friedel-Crafts reaction at substantially each point of chlorination and, considering a single wax molecule as such, 18% chlorwax will yield diaryl wax on reaction. Actually, of course, the poly-arylated wax is of a much more complex structure than indicated by the term: diaryl wax. The poly-aryl waxes up to tetra-aryl may be used to obtain the advantages of the invention, corresponding to Friedel-Crafts products from chlorwaxes of about 18% to about 30% chlorine content. Preferably, tri-aryl derivatives are used, for example, those derived by reaction with chlorwax of about 25% chlorine content.

The proportion of aromatic reactant to combined chlorine in the Friedel-Crafts reaction is important as a governing factor in the degree of resilience. This determines the average number of points at which each aryl nucleus will be substituted by an alkyl group. For general considerations, this ratio must be based on the chlorine in the chlorwax since it is this molar ratio rather than that based on mols of wax which governs resilience. The compositions with which this invention is concerned are prepared from poly-aryl waxes and the like in which the average aryl nucleus is substituted at from 2 to 4 points; that is, an intermediate prepared by the Friedel-Crafts reaction will have been formed in a reaction mixture in which the molar ratio of combined chlorine to aromatic was between 2 to 1 and 4 to 1.

The poly-arylated waxes may be conveniently designated by reference to the ratio of combined chlorine to aromatic and the chlorine content of the wax used in their preparation. Thus, wax phenol prepared by reacting 27% chlorwax with phenol in the ratio of one mol phenol to three mols of combined chlorine will be designated hereinafter as "wax-phenol (3–27)" with corresponding nomenclature for other poly-arylated waxes; the first figure in the parentheses denoting the molar ratio of combined chlorine to aromatic and the second referring to chlorine content of the chlorwax used.

The poly-arylated waxes used in accordance with the invention are solids of varying elasticity. Those prepared from the chlorwaxes of lower chlorine content may be somewhat gummy. But all, even these latter gummy substances, exhibit a characteristic conchoidal fracture and resinous luster at a fracture surface.

The chemical nature of the poly-arylated waxes are, as might be expected, widely varied and extremely complex. A composition derived from phenol and 27% chlorwax (petroleum wax chlorinated to 27% chlorine content) in proportions to theoretically tri-alkylate the phenol contains about 25% phenol, with the remainder of the molecule consisting of combined wax radicals. The poly-arylated waxes may be represented by the general formulae as set out below, it being understood that these merely represent probable linkages. It is not attempted to accurately depict molecules actually occurring in the complex compositions, since these vary widely and very likely include in a single molecule several of the linkages indicated below. For simplicity, the aromatic nuclei are represented uniformly by the phenyl radical.

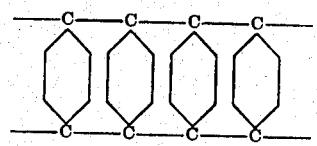

The compositions are represented in the foregoing formula with a single attachment of the aromatic group to each wax group, but in the reaction of chlorwax of higher chlorine content with aromatic compounds, apparently the aromatic group will be attached in some cases to more than one carbon of the same wax group, particularly in reactions with aromatic compounds of the condensed nuclei and polycyclic type.

Some chain formation would be expected to occur in the reaction of aromatic compounds with chlorinated waxes, in which case the following representation would be applicable ⸺→ representing a continuation of the chain structure.

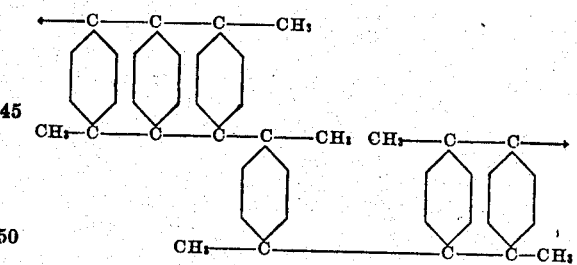

The poly-arylated wax compositions are represented in the foregoing formulae as di-substituted aromatic compounds, but an amount of chlorwax can be reacted with the aromatic compounds sufficient to substitute all the replaceable hydrogens of the aromatic nucleus. Generally, an amonut of chlorwax sufficient to tri-substitute the aromatic compound is favored.

Example I

A suitable poly-arylated wax is obtained by reaction of 48 grams of phenol with 200 grams of chlorwax containing 27% chlorine by weight in the presence of 3 grams of anhydrous aluminum chloride.

Paraffin wax of A. S. T. M. melting point of about 126° F. and of average molecular weight of about 350, is melted and a current of chlorine introduced at a temperature of about 200° F. until the mass contains about 27% by weight of chlorine. The phenol is then introduced, followed by gradual addition of the anhydrous $AlCl_3$ at a temperature of about 150° F. with rapid stirring. The temperature of the mixture is gradually raised to about 350° F. during a two-hour period, with efficient stirring to reduce foaming caused by evolution of HCl gas. The reaction mixture is held at this temperature until the evolution of HCl is completed, which will require about one hour. The reaction mixture is then cooled and contacted with water to decompose the aluminum chloride reaction product, whereby the aluminum chloride can be removed from the mixture. To insure removal of corrosive halogen, the product is then digested with dilute (1%) caustic soda by refluxing the mixture several hours, followed by removing the alkaline solution and neutralizing by water washing or neutralizing with dilute hydrochloric or acetic acid. During this purification, the product becomes coagulated and in this state can be formed into a sheet by running through squeeze rolls and further washed in this rolling operation. The composition can be readily dried on a heated mill roll or can be cut into sheets and laid aside to dry.

*Example II*

Wax phenol (3–30) is similarly prepared from 600 parts of chlorwax of 30% chlorine content, 159 parts of phenol and 12 parts of aluminum chloride.

*Example III*

Poly-arylated waxes from chlorwax of lower chlorine content are also readily prepared. For example, 4,540 parts by weight of 18% chlorwax, 721 parts of phenol and 180 parts of aluminum chloride were used in preparing wax phenol (3–18).

In this Friedel-Crafts reaction, the chlorwax and hydroxy-aromatic compound are mixed together at a temperature slightly above the melting point of the wax, (in the present instance, under 150° F.), thereafter adding the aluminum chloride catalyst slowly in order to avoid excessive foaming due to evolution of hydrochloric acid gas.

The reaction rate is controlled by regulating the temperature. Using 2% aluminum chloride with respect to chlorwax, some reaction takes place around 140° F., but a steady rapid evolution of HCl gas is obtained around 200° F. The reaction may be carried out suitably by heating the reaction mixture to 200° F., then gradually raising the temperature during a two-hour period to 350° F. to complete the reaction. As the reaction proceeds, the mixture becomes more viscous, but by gradually raising the temperature, the viscosity of the mixture is sufficiently reduced, so that diluents are unnecessary to give proper mixing.

*Example IV*

Wax beta-naphthol (3–20) is similarly prepared from 800 parts of 20% chlorwax, 216.3 parts of beta-naphthol and 24 parts of aluminum chloride.

To obtain the desired product of the invention, the polyarylated waxes are treated with a resinifying agent, i. e., a composition adapted to resinify phenols. In my prior co-pending application Serial No. 187,677, filed January 29, 1938, of which this case is a continuation-in-part, I have disclosed a number of such treating agents. Of the known materials for resinifying phenols, I prefer to use hexamethylene-tetramine or formaldehyde in acid medium; or sulfur mono-chloride. In general, the aldehydes having a reactive methylene group are very effective. Further, suitable treating agents include broadly, aldehydes, ketones, alcohols and halogenated hydrocarbons. Accordingly, for the purposes of this invention, the following compounds might be mentioned as illustrative of the resinifying agents that may be used. Aliphatic aldehydes, such as formaldehyde and its equivalent derivatives as typified by hexamethylene-tetramine and trioxymethylene; also acetaldehyde, propylaldehyde, butyraldehyde and higher homologous aldehydes; ketones, such as acetone, methyl ethyl ketone, diethyl ketone, ethyl propyl ketone and the like; monovalent alcohols and polyvalent alcohols, such as benzyl alcohol, glycol, ethylene glycol, and glycerine; and those resinifying agents which eliminate halogen hydrides in reaction with the above-mentioned hydroxyaromatic hydrocarbons as typified by halogenated aryl hydrocarbons, for example, benzyl chloride, chlornaphthalene and chloranthracene.

Other suitable treating agents, as described in my prior copending application Serial No. 187,676, filed January 29, 1938, are sulfur reagents such as elementary sulfur and sulfur chlorides, (e. g. sulfur mono-chloride), and oxidizing agents such as oxygen and potassium permanganate.

The two said prior applications are continuations-in-part of my earlier application Serial No. 18,342, filed April 26, 1935.

One novel aspect of this invention is in the small amounts of resinifying agents required for formation of a tougher product. This is due to the complexity of the products wherein more than one aryl group is present per molecule as described in the foregoing. In the resinification of phenols in prior art, an amount of resinifying agent equivalent to the phenol was necessary, while only a fraction of this amount is required for the poly-arylated wax compounds. The reason for this will be clear by examining the representative formulae of column 4. For instance, it is apparent that a single molecule of formaldehyde could join two molecules of the poly-arylated compound by reacting with a single phenol substituent of each molecule. In other words, the compositions of this invention may carry phenolic substituents which are not reacted with the resinifying agent.

*Example V*

The poly-arylated wax of Example III of about 15% phenol content is treated with a half molar quantity of hexamethylene-tetramine under the pressure developed in the reaction at a temperature of 300° F. The reaction may also be carried out in open vessels at atmospheric pressure, by adding hexamethylene-tetramine at intervals with stirring. After about 2 hours, the mixture converts to a rubber-like mass.

Reactions of the poly-arylated waxes with trioxymethylene are suitably conducted at about 200° F. in the presence of about 2% hydrochloric acid. Similarly, butyraldehyde and glycerol may be used at about 300° F. using 2% acid catalyst, hydrochloric and sulfuric, respectively.

*Example VI*

The poly-arylated wax of Example II may be condensed with sulfur monochloride to form a rubber-like product. Ethylene chloride is used as a diluent to reduce the viscosity of the reaction mixture. The reaction takes place at 150° F. with vigorous evolution of hydrogen chloride. The condensation is completed by raising the temperature to the boiling point of ethylene chloride (180° F.) during a 15-minute period. Thereafter the product is obtained by distillation of the solvent. A half molar quantity of S₂Cl₂ is used as reactant.

Example VII

A sample of the highly viscous wax beta naphthol (3-20) of Example IV was mixed with 2% by weight of hexamethylene-tetramine and heated at 150° C. for 2 hours at which time it had converted to a rubber-like mass.

Example VIII

A sample of wax-substituted phenol (3-27) of Example I was mixed with 2% by weight of hexamethylene-tetramine on a rubber mill and then heated in a mold at 180° C. for one hour. A tough, rubber-like composition of good flexibility and high resistance to flow under pressure was formed.

Example IX

A Friedel-Crafts reaction product formed as in Example II was water-washed without any treatment with dilute caustic to remove unreacted phenol and then reacted with 30 grams of 37% solution of formaldehyde in the presence of 18 cc. of 2% HCl for one hour. The product was then water-washed and dried on a rubber mill. This product was then milled with 2% by weight of hexamethylene-tetramine and heated in a mold at 150° C. for one-half hour. This product was harder than that of Example VIII but still had high resistance to shock without incorporating fillers ordinarily used for this purpose.

I claim:

1. A resilient composition of matter formed by heating chlorinated petroleum wax of at least 18% chlorine content with a phenol having as sole nuclear substituents radicals from the class consisting of hydrogen, hydroxy, alkyl, aryl, aralkyl and alkoxy, in the presence of a Friedel-Crafts catalyst, and in a molar ratio of combined chlorine to phenol of not less than 2 or more than 4 to produce a condensation product and in which, on the average, more than one aryl nucleus is attached to each wax radical and each aryl nucleus is substituted by wax radicals at from 2 to 4 points, and thereafter heating said condensation products with hexamethylenetetramine to react the same.

2. A resilient composition of matter formed by heating chlorinated petroleum wax of 18% to 30% chlorine content with a phenol having as sole nuclear substituents radicals from the class consisting of hydrogen, hydroxy, alkyl, aryl, aralkyl and alkoxy, in the presence of a Friedel-Crafts catalyst, and in a molar ratio of combined chlorine to phenol of not less than 2 or more than 4 to produce a condensation product and in which, on the average, more than one aryl nucleus is attached to each wax radical and each aryl nucleus is substituted by wax radicals at from 2 to 4 points, and thereafter heating said condensation products with hexamethylenetetramine to react the same.

3. A resilient composition of matter formed by heating chlorinated petroleum wax of about 25% chlorine content with a phenol having as sole nuclear substituents radicals from the class consisting of hydrogen, hydroxy, alkyl, aryl, aralkyl and alkoxy, in the presence of a Friedel-Crafts catalyst, and in a molar ratio of combined chlorine to phenol of not less than 2 or more than 4 to produce a condensation product and in which, on the average, more than one aryl nucleus is attached to each wax radical and each aryl nucleus is substituted by wax radicals at from 2 to 4 points, and thereafter heating said condensation products with hexamethylenetetramine to react the same.

4. A resilient composition of matter formed by heating chlorinated petroleum wax of at least 18% chlorine content with phenol, in the presence of a Friedel-Crafts catalyst, and in a molar ratio of combined chlorine to phenol of not less than 2 or more than 4 to produce a condensation product and in which, on the average, more than one aryl nucleus is attached to each wax radical and each aryl nucleus is substituted by wax radicals at from 2 to 4 points, and thereafter heating said condensation products with hexamethylenetetramine to react the same.

ORLAND M. REIFF.

REFERENCES CITED

The following references are of record in the file of this patent:

UNITED STATES PATENTS

| Number | Name | Date |
| --- | --- | --- |
| 2,178,571 | Flett | Nov. 7, 1939 |
| 2,134,547 | Buc | Oct. 25, 1938 |
| 2,098,824 | Harvey | Nov. 9, 1937 |